(12) United States Patent
Mallard

(10) Patent No.: US 6,808,233 B2
(45) Date of Patent: Oct. 26, 2004

(54) ADJUSTMENT MECHANISM FOR A MOTOR VEHICLE SEAT, AND A SEAT EQUIPPED WITH SUCH A MECHANISM

(75) Inventor: Patrick Mallard, Flers (FR)

(73) Assignee: Hutchinson, Paris (FR)

( * ) Notice: Subject to any disclaimer, the term of this patent is extended or adjusted under 35 U.S.C. 154(b) by 32 days.

(21) Appl. No.: 10/277,423

(22) Filed: Oct. 22, 2002

(65) Prior Publication Data

US 2004/0012236 A1 Jan. 22, 2004

(30) Foreign Application Priority Data

Nov. 16, 2001 (FR) .............................. 01 14832

(51) Int. Cl.[7] .............................................. A47C 1/02
(52) U.S. Cl. ................................................ 297/344.1
(58) Field of Search ...................... 297/344.1; 248/429; 74/89.28, 39.14

(56) References Cited

U.S. PATENT DOCUMENTS 2,018,828 A 10/1935 Bell
5,727,768 A 3/1998 Sakamoto
5,816,555 A 10/1998 Ito et al.
5,823,499 A * 10/1998 Ito et al. ..................... 248/429
6,499,712 B1 * 12/2002 Clark et al. ................. 248/429
6,575,421 B1 * 6/2003 Houston et al. ............ 248/429

FOREIGN PATENT DOCUMENTS

FR 2 796 013 A1 1/2001

OTHER PUBLICATIONS

International Search Report for corresponding French Application No. 01 14832–French report dated Jul. 08, 2002.

* cited by examiner

Primary Examiner—Milton Nelson, Jr.
(74) Attorney, Agent, or Firm—Marshall, Gerstein & Borun LLP

(57) ABSTRACT

An adjustment mechanism for adjusting a motor vehicle seat comprising a worm screw mounted in a nut which is carried by a rigid base, the worm screw being mounted to rotate relative to the base. A locking piece is mounted on the base so as to be pushed by the nut into an active position in which said locking piece comes into engagement with the worm screw, when a large axial force is transmitted to the worm screw.

10 Claims, 3 Drawing Sheets

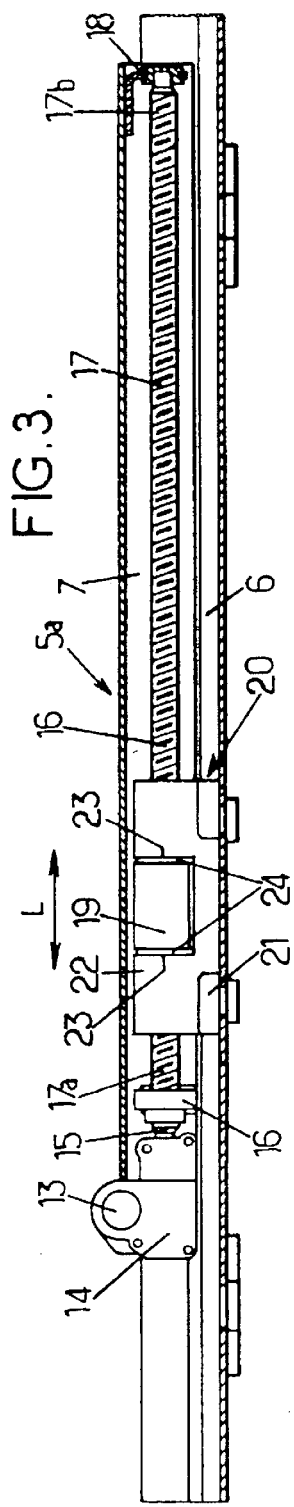
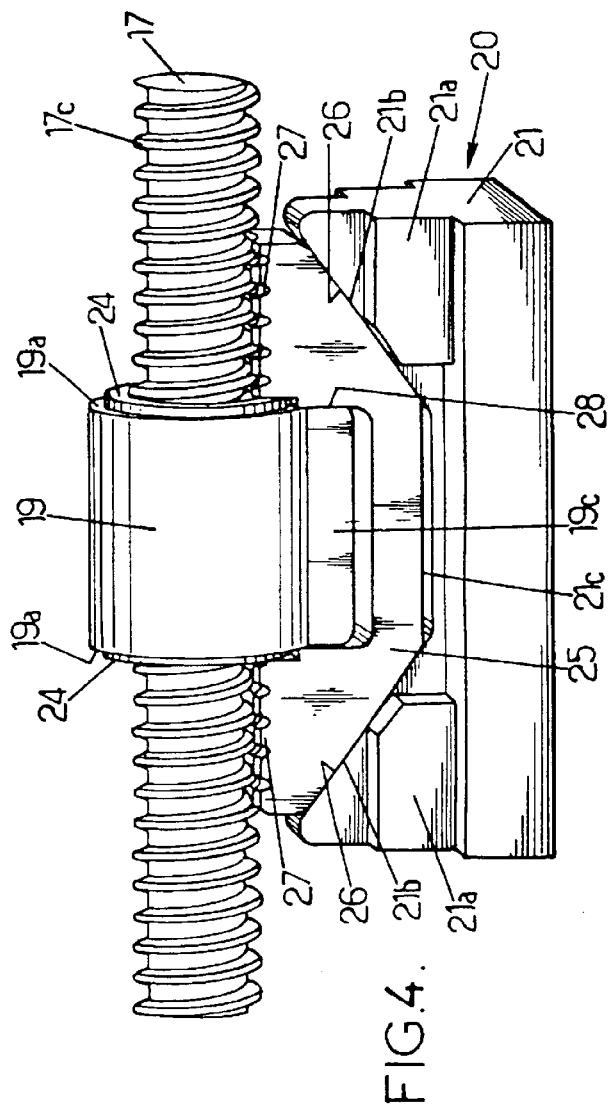
FIG. 3.
FIG. 4.

ADJUSTMENT MECHANISM FOR A MOTOR VEHICLE SEAT, AND A SEAT EQUIPPED WITH SUCH A MECHANISM

The present invention relates to adjustment mechanisms for adjusting motor vehicle seats, and to seats equipped with such mechanisms.

More particularly, the invention relates to an adjustment mechanism for adjusting a motor vehicle seat, said adjustment mechanism comprising a worm screw mounted in a nut which is carried by a rigid base, the worm screw being mounted to rotate relative to the base to cause the screw and the base to move in translation relative to each other along a longitudinal axis, the nut normally being held in a rest position relative to the base, and said nut being mounted on the base with a certain amount of clearance along the longitudinal axis.

BACKGROUND OF THE INVENTION

Document FR-A-2 796 013 describes an example of such an adjustment mechanism, which is quite satisfactory.

OBJECTS AND SUMMARY OF THE INVENTION

A particular object of the present invention is to improve adjustment mechanisms of that type still further, in particular so as to increase their strength and/or to enable lower-strength nuts to be used without penalizing the strength of the mechanism as a whole.

To this end, in the invention, an adjustment mechanism of the type in question further comprises at least one locking piece which is mounted to move relative to the base between firstly a retracted position in which said locking piece does not interfere with the worm screw and secondly at least a first active position in which said locking piece comes into engagement with the worm screw to prevent said worm screw from moving relative to the base;

the nut is adapted to act on the locking piece when said nut is moved at least in a first direction along the longitudinal axis from the rest position of said nut;

and the locking piece is mounted on the base such that the nut moving in said first direction causes said locking piece to move towards its first active position.

By means of these provisions, when the worm screw is subjected to a large force along the longitudinal axis, it is prevented from moving relative to the base not only by the nut, but also by the locking piece, thereby making the adjustment mechanism very strong in the event of an accident.

Thus, the nut can be dimensioned to take up only the normal forces transmitted by the worm screw during normal use, which makes it possible, for example, to use a nut that is relatively small, hence:

compactness is improved; and friction is reduced, and thus wear on the screw is reduced, and noise during use is reduced.

These provisions also make it possible to use a nut made of a material that is not as strong as steel, e.g. of a plastics material that is not filled with glass fibers or with carbon fibers, which makes it possible to achieve quiet operation and low wear on the worm screw, compared with a nut made of steel or with a nut made of a plastics material filled with glass fibers or with carbon fibers.

Naturally, the invention is not limited to such nuts made of a plastics material, but rather it can be used regardless of the material of the nut, including a metal material.

In preferred embodiments of the invention, any of the following provisions may optionally be used:

the nut is made of a plastics material not filled with reinforcing fibers;

the nut is adapted to push the locking piece at least in the first direction, and said locking piece has a first abutment surface in contact with a first cam surface belonging to the base, said first abutment surface and said first cam surface being adapted to move the locking piece towards the worm screw when said locking piece is moved by the nut in said first direction;

the first cam surface is in the shape of a ramp converging towards the worm screw in the first direction, and the first abutment surface of the locking piece is also in the shape of a ramp that is substantially parallel to the first cam surface;

the worm screw is provided with at least one helical thread and the locking piece is provided with a first set of teeth adapted to engage in said thread when said locking piece is in its first active position;

the base has a rigid cage which surrounds the worm screw and which has two abutment faces disposed on either side of the nut along the longitudinal axis, two flexible buffers being interposed between the nut and respective ones of said abutment faces to urge the nut resiliently into its rest position;

the nut is made of a plastics material, and is adapted to deform plastically against said abutment face when the worm screw is subjected to a force that is larger than a limit value along the longitudinal axis, and the locking piece is adapted to press the worm screw against the cage when the nut deforms plastically against said abutment face;

the adjustment mechanism further comprises at least one runner designed to enable a motor vehicle seat to be adjusted longitudinally, said runner comprising first and second rails which extend along the longitudinal axis, the first rail being secured to the base, and the worm screw being mounted to rotate on the second rail; and the nut is further adapted to push the locking piece in a second direction opposite from the first direction, and said locking piece further has a second abutment surface in contact with a second cam surface belonging to the base, said second abutment surface and said second cam surface being adapted to move the locking piece towards a second active position in which said locking piece comes into engagement with the worm screw when said locking piece is moved by the nut in said second direction; the second cam surface is in the shape of a ramp converging towards the worm screw in the second direction and the second abutment surface of the locking piece is also in the shape of a ramp that is substantially parallel to the second cam surface; the locking piece is provided with a second set of teeth adapted to engage in said thread when said locking piece is in its second active position; and, between its first and second sets of teeth, the locking piece has a notch open towards the worm screw and in which a tab belonging to the nut is engaged, with a certain amount of clearance making it possible for the locking piece to move towards the worm screw from its retracted position.

The invention also provides a vehicle seat having a seat proper whose longitudinal position can be adjusted by means of an adjustment mechanism as defined above.

BRIEF DESCRIPTION OF THE DRAWINGS

Other characteristics and advantages of the invention appear from the following description of an embodiment of it, given by way of non-limiting example, and with reference to the accompanying drawings.

In the drawings:

FIG. 3 is a longitudinal section view of one of the runners belonging to the longitudinal adjustment mechanism of FIG. 2, the section being on line III—III of FIG. 2;

FIG. 4 is a perspective detail view of a screw-and-nut assembly belonging to the runner of FIG. 3, a portion of the base on which the nut is mounted having been removed for greater clarity;

MORE DETAILED DESCRIPTION

In the various figures, like references designate identical or similar elements.

Figure 1:
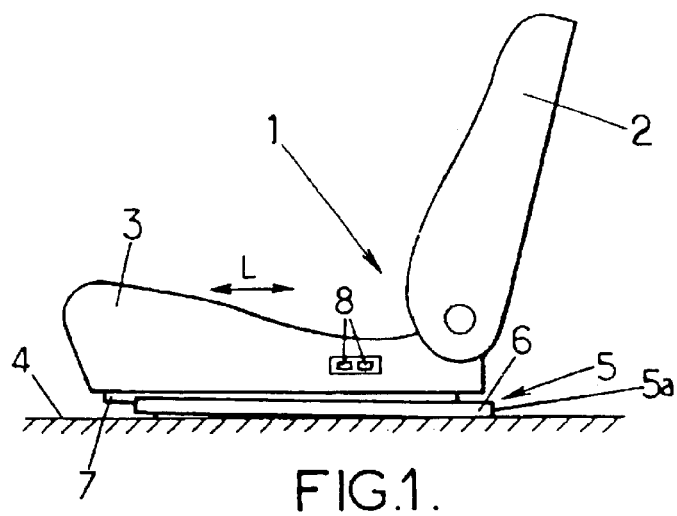
FIG. 1 is a diagrammatic view of a vehicle seat equipped with a longitudinal adjustment mechanism in an embodiment of the invention.

FIG. 1 shows a vehicle seat 1, in particular a front seat of a motor vehicle. The seat comprises a back 2 mounted on a seat proper 3, itself fixed to the floor 4 of the vehicle via a longitudinal adjustment mechanism 5 made up of two parallel runners 5a, only one of which is shown in FIG. 1.

Each of the runners 5a is made up of a fixed rail 6 secured to the floor 4 of the vehicle, and of a moving rail 7 mounted to slide along the fixed rail 6, so as to enable a user to adjust the position of the seat along the longitudinal axis L.

Such longitudinal adjustment is performed electrically, as a function of commands received from the user who, for example, has access to two control buttons 8 for moving the seat 1 respectively forwards and backwards.

Figure 2:
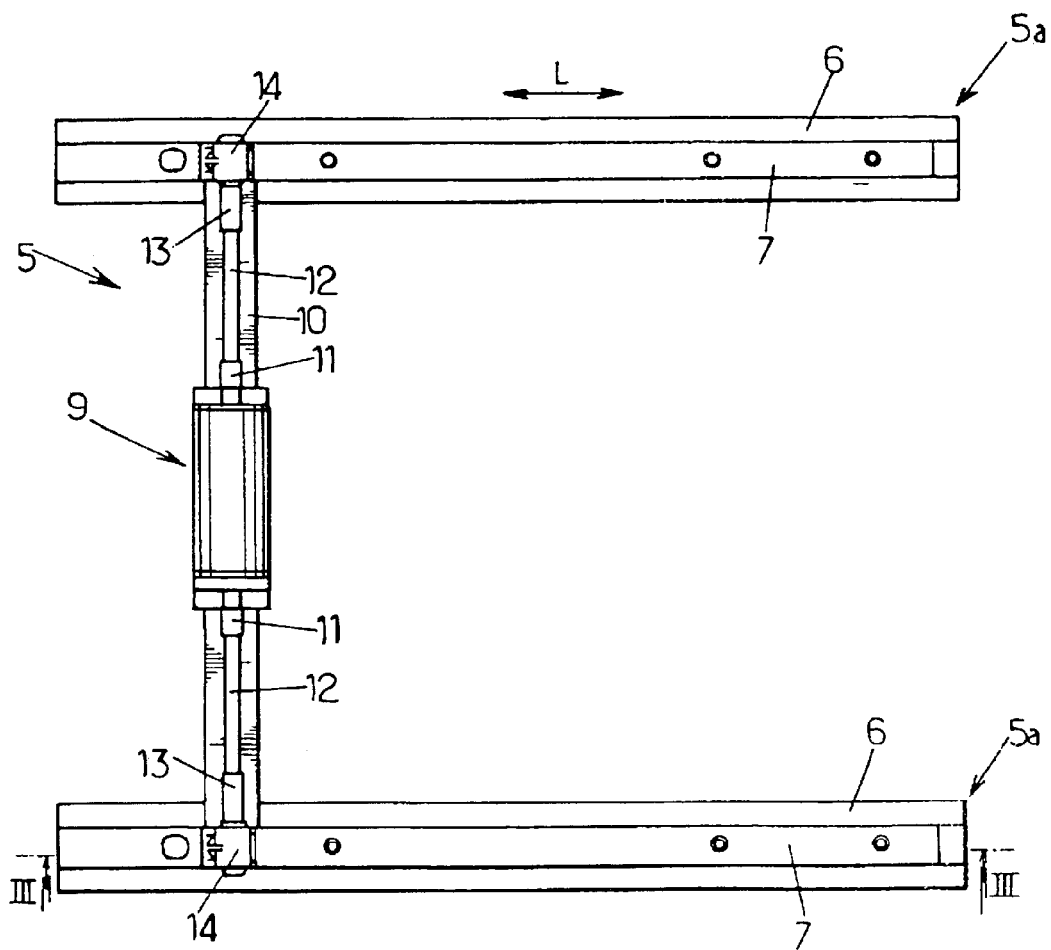
FIG. 2 is a plan view of the longitudinal adjustment mechanism of the seat of FIG. 1.

The control buttons 8 make it possible, for example, to actuate an electric motor and gearbox unit 9 which is shown in FIG. 2, and which can be fixed, in particular, to a crosspiece 10 secured to the moving rails 7 of the two runners 5a of the seat.

In the example in question, the motor and gearbox unit 9 is provided with two rotary outlet shafts 11, each of which is connected to a flexible rod 12 or to some other transmission member adapted to rotate two transverse inlet shafts 13 that are mounted to rotate on respective ones of the moving rails 7 of the two runners 5a.

As can be seen in FIG. 3, the inlet shaft 13 of each runner drives a rotary outlet shaft 15 via a deflector gear 14, the outlet shaft extending along the longitudinal axis L at one of the ends of the moving rail 7.

The outlet shaft 15 is fixed via a coupling 16 to one of the ends 17a of a worm screw 17 that is generally made of metal, and whose other end 17b is mounted to be free to rotate at the opposite end of the moving rail 7 of the runner.

Figure 5:
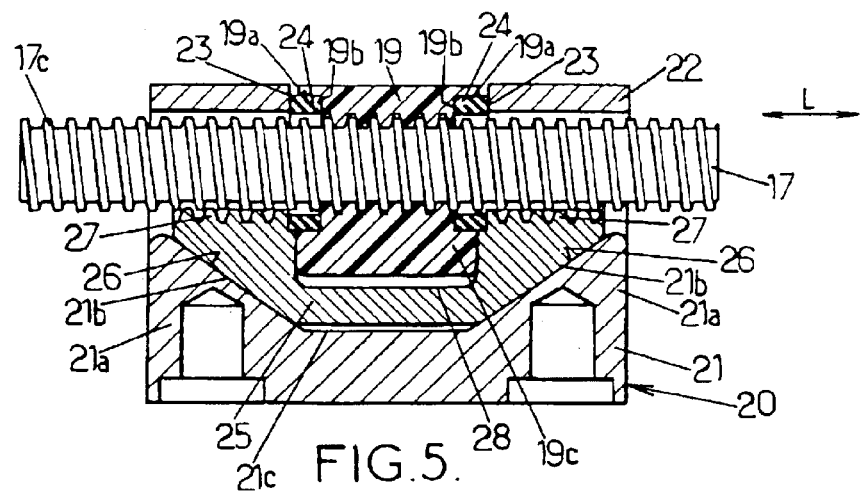
FIG. 5 is a longitudinal vertical section view of the screw-and-nut assembly of FIG. 4, showing the entire base that carries the nut, in the rest position.

As shown in more detail in FIGS. 4 and 5, the worm screw 17 of each runner controls a drive device which comprises a nut 19 in which said worm screw is screwed. The nut 19 is preferably made of a plastics material, e.g. of polyamide, and in particular of a plastics material without any carbon fibers, glass fibers, or other reinforcing fibers.

The nut 19 has a body which is circularly cylindrical and which extends axially over a length lying, for example, in the range 1.5 centimeters (cm) to 2.5 cm, between two end faces 19a, each of which forms an internal recess 19b. The cylindrical body of the nut 19 is also extended radially outwards by a rib 19c that is substantially rectangular in shape, and that forms a tab over the entire axial length of the nut 19, which tab is of thickness lying in the range 0.5 cm and 1 cm, for example.

The nut 19 is held stationary on the fixed rail 6 of the corresponding runner by a base 20 which, in the example shown, is made up of a metal stand 21 on which a separate cage 22 made of thick sheet metal is mounted, which cage is fixed to the stand 21 in particular by welding or by some other means.

At each of its axial ends, the stand 21 is provided with a projection 21a that projects towards the worm screw 17. The two projections 21a on the stand 21 have cam surfaces 21b in the form of ramps that slant away from each other towards the worm screw 17, and that define between them a notch 21c that is substantially in the form of a truncated V-shape.

In addition, the cage 22 of the base 20 is shaped to co-operate with the rib 19c so as to prevent the nut 19 from rotating, and said cage is provided with a notch which defines two abutment faces 23 disposed facing the end faces 19a of the nut, so as to prevent the nut 19 from moving axially relative to the base 20, but with a certain amount of lost motion.

The cage 22 surrounds the worm screw 17 at least around its sides and remote from the stand, with a small amount of clearance, e.g. lying in the range 0.5 millimeters (mm) to 1 mm.

In addition, two resilient buffers 24, advantageously constituted by elastomer rings, are inserted in the recesses 19b in the end faces of the nut, and are interposed between the nut and said abutment faces 23, so as to hold the nut 19 normally in a middle position, slightly spaced apart from each of the abutment faces 23. Advantageously, the elastomer rings 24 may be mounted to be pre-stressed, so as to press continuously against the abutment faces 23.

Finally, a locking piece 25 is disposed in the notch 21c in the stand. The locking piece is preferably made of metal and may, for example, be of thickness substantially equal to the thickness of the rib 19c. The locking piece 25 has two ramp-shaped abutment surfaces 26 which are substantially parallel to the cam surfaces 21b of the stand, and which rest on said cam surfaces. At each of the abutment surfaces 26, the locking piece 25 is further provided with a set of teeth 27 which is normally set back from the thread 17c of the worm screw when the locking piece 25 is in the retracted position shown in FIGS. 4 and 5, corresponding to the adjustment mechanism being in its normal use position.

Between these two sets of teeth 27, the locking piece 25 forms a notch 28 that is substantially rectangular in shape and in which the rib 19c on the nut 19 is engaged snugly along the longitudinal axis L, but with a certain amount of vertical clearance enabling the locking piece 25 to move towards the worm screw 17 into an active position in which the sets of teeth 27 of said locking piece come into engagement with the thread 17c of the worm screw.

The locking piece 25 also co-operates by lateral abutment with the cage 22 of the base so as to be held in alignment with the rib 19c of the nut.

When a force F is transmitted to the nut 19 by the worm screw 17 in either direction along the longitudinal axis L (see FIG. 6)), said axial force tends to compress one of the elastomer rings 24 that flank the nut, so that the nut 19 moves axially towards the corresponding abutment face 23 of the cage 22. The rib 19c on the nut then pushes the locking piece 25 in the direction of the force F so that the corresponding abutment surface 26 on the locking piece slides along the corresponding cam surface 21 of the stand 21, thereby moving said locking piece upwards.

Figure 6:
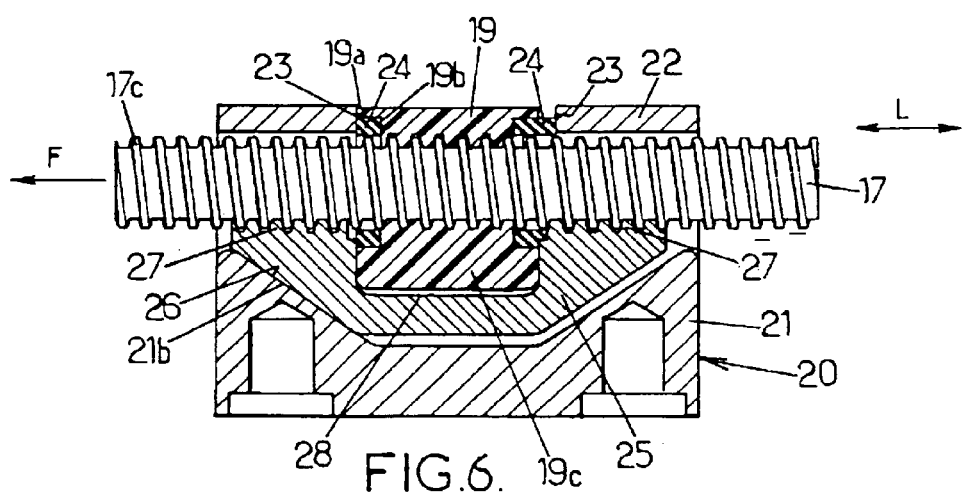
FIG. 6 is a view similar to FIG. 5, when the worm screw of the screw-and-nut assembly is subjected to a longitudinal force smaller than a certain limit value.

When the force F is large enough, e.g. approximately in the range 3,000 newtons (N) to 7,000 N, in particular about 5,000 N, the locking piece 25 is moved into the active position shown in FIG. 6, in abutment against the worm screw 17. In this position, the sets of teeth 27 on the locking piece are in engagement with the helical thread 17c of the worm screw. In addition, one of the end faces 19a of the nut 19 is then in abutment against the corresponding abutment face 23, the elastomer ring 24 then being fully compressed inside the corresponding recess 19b.

Figure 7:
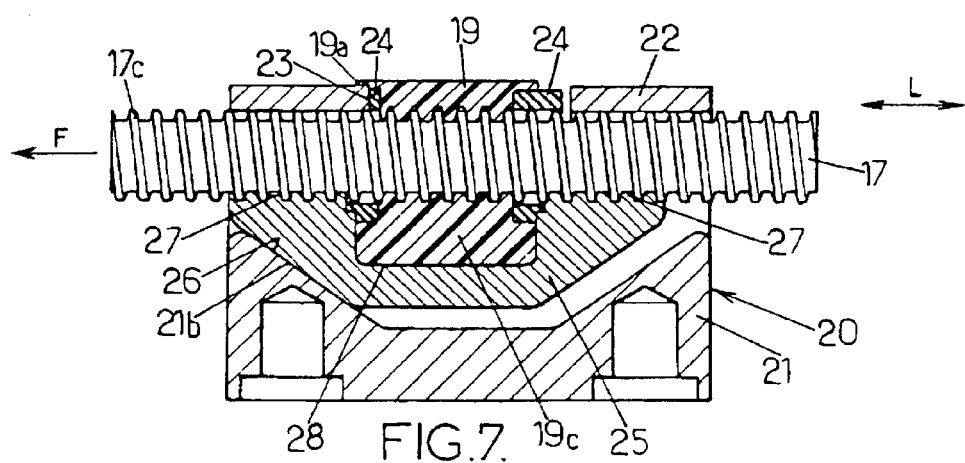
FIG. 7 is a view similar to FIG. 6, when said longitudinal force is greater than said limit value.

When the force F is larger than the above-mentioned value, i.e., for example, when said force F is greater than about 5,000 N, as shown in FIG. 7, the nut 19 continues to move slightly in the same direction as the force F, thereby causing the abutment face 23 against which the nut 19 abuts to penetrate partially into said nut, by the nut deforming plastically (it is however possible to imagine that it is the abutment face 23 that is made of a material that is not as hard as the nut 19 and that deforms on coming into contact with the nut).

As shown in FIG. 7, this additional movement of the nut 19 also causes the locking piece 25 to move axially to an additional extent by continuing to slide along the cam surface 21b of the base and by moving simultaneously towards the nut 19 until all of the clearance between the notch 26 and the rib 19c of the nut is taken up.

During this movement, the locking piece 25 can also push the worm screw 19 slightly upwards when said worm screw is relatively flexible (for example, it may be a worm screw made of steel and of diameter lying in the range 0.5 cm to 2 cm).

In this position, the worm screw 17 comes into abutment against the top portion of the cage 22, so that if the force F is very large, as it is, for example, when the vehicle is subjected to frontal impact, the locking piece 25 prevents any relative movement between the base 20 and the worm screw 17 because said locking piece is then held stationary by being wedged in its active position, in engagement with the worm screw.

It should be noted that the device of the invention may optionally include:

- a locking piece 25 having a single abutment surface 26 and a single set of teeth 27, acting, for example, only when the force F is directed towards the front of the vehicle (i.e. in the event of frontal impact), in which case the base 20 has a single cam surface 21b in register with the abutment surface 26 of the locking piece; or
- two separate locking pieces 25, each of which acts in a respective direction, and each of which has an abutment surface 26 co-operating with a respective one of the cam surfaces 21b of the base.

In addition, it should be noted that each base 20 and the corresponding nut 19 may be secured to a respective one of the moving rails 7 of the two runners, the worm screws 17 then being mounted to rotate on respective ones of the fixed rails 6 of the two runners. In which case, the motor-and-gearbox unit 9 is secured to the fixed rails 6 of the two runners via the above-mentioned crosspiece 10, or via the floor 4 of the vehicle.

What is claimed is:

1. An adjustment mechanism for adjusting a motor vehicle seat, said adjustment mechanism comprising a worm screw mounted in a nut which is carried by a rigid base, the worm screw being mounted to rotate relative to the base to cause the screw and the base to move in translation relative to each other along a longitudinal axis, the nut normally being held in a rest position relative to the base, and said nut being mounted on the base with a certain amount of clearance along the longitudinal axis;

wherein said adjustment mechanism further comprises at least one locking piece which is mounted to move relative to the base between firstly a retracted position in which said locking piece does not interfere with the worm screw and secondly at least a first active position in which said locking piece comes into engagement with the worm screw to prevent said worm screw from moving relative to the base;

wherein the nut is adapted to act on the locking piece when said nut is moved at least in a first direction along the longitudinal axis from the rest position of said nut;

and wherein the locking piece is mounted on the base such that the nut moving in said first direction causes said locking piece to move towards its first active position.

2. An adjustment mechanism according to claim 1, in which the nut is made of a plastics material not filled with reinforcing fibers.

3. An adjustment mechanism according to claim 1, in which the nut is adapted to push the locking piece at least in the first direction, and said locking piece has a first abutment surface in contact with a first cam surface belonging to the base, said first abutment surface and said first cam surface being adapted to move the locking piece towards the worm screw when said locking piece is moved by the nut in said first direction.

4. An adjustment mechanism according to claim 3, in which the first cam surface is shaped like a ramp converging towards the worm screw in the first direction, and the first abutment surface of the locking piece is also in the shape of a ramp that is substantially parallel to the first cam surface.

5. An adjustment mechanism according to claim 1, in which the worm screw is provided with at least one helical thread and the locking piece is provided with a first set of teeth adapted to engage in said thread when said locking piece is in its first active position.

6. An adjustment mechanism according to claim 1, in which the base has a rigid cage which surrounds the worm screw and which has two abutment faces disposed on either side of the nut along the longitudinal axis, two flexible buffers being interposed between the nut and respective ones of said abutment faces to urge the nut resiliently into its rest position.

7. An adjustment mechanism according to claim 6, in which the nut is made of a plastics material, and is adapted to deform plastically against said abutment face when the worm screw is subjected to a force that is larger than a limit value along the longitudinal axis, and the locking piece is adapted to press the worm screw against the cage when the nut deforms plastically against said abutment face.

8. An adjustment mechanism according to claim 6, in which:

the nut is further adapted to push the locking piece in a second direction opposite from the first direction, and said locking piece further has a second abutment surface in contact with a second cam surface belonging to the base, said second abutment surface and said second cam surface being adapted to move the locking piece towards a second active position in which said locking piece comes into engagement with the worm screw when said locking piece is moved by the nut in said second direction;

the second cam surface is shaped like a ramp converging towards the worm screw in the second direction and the second abutment surface of the locking piece is also shaped like a ramp that is substantially parallel to the second cam surface;

the locking piece is provided with a second set of teeth adapted to engage in said thread when said locking piece is in its second active position; and between its first and second sets of teeth, the locking piece has a notch open towards the worm screw and in which a tab belonging to the nut is engaged, with a certain amount of clearance making it possible for the locking piece to move towards the worm screw from its retracted position;

the locking piece being adapted to press the worm screw against the cage when said nut deforms plastically against said abutment face.

9. An adjustment mechanism according to claim 1, further comprising at least one runner designed to enable a motor vehicle seat to be adjusted longitudinally, said runner comprising first and second rails which extend along the longitudinal axis, the first rail being secured to the base, and the worm screw being mounted to rotate on the second rail.

10. A vehicle seat including a seat proper whose longitudinal position can be adjusted by means of an adjustment mechanism according to claim 1.

* * * * *